No. 638,363. Patented Dec. 5, 1899.
D. T. SHARPLES.
COMBINED CHURN AND BUTTER WORKER.
(Application filed Dec. 27, 1898.)
(No Model.) 2 Sheets—Sheet 1.
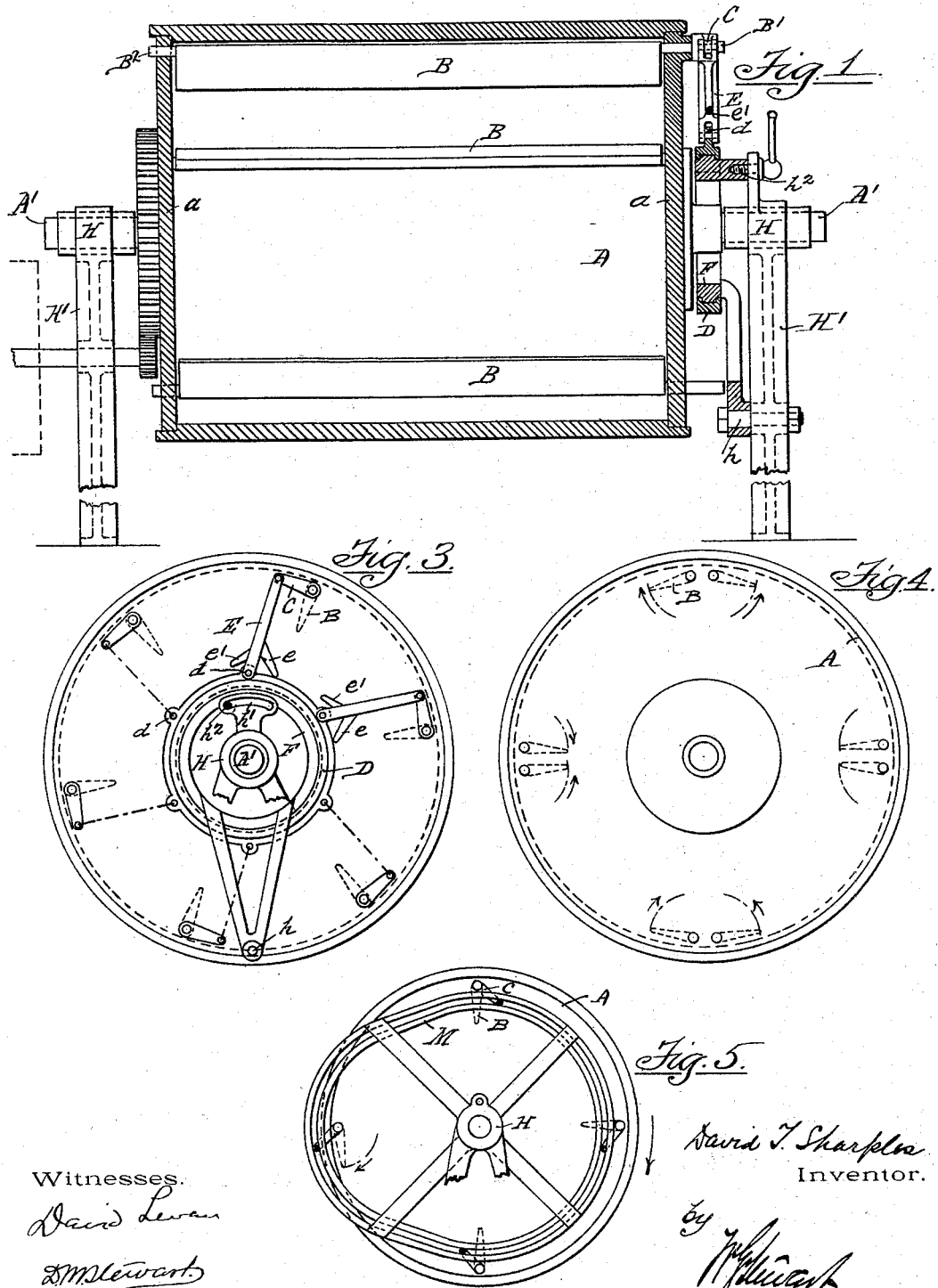

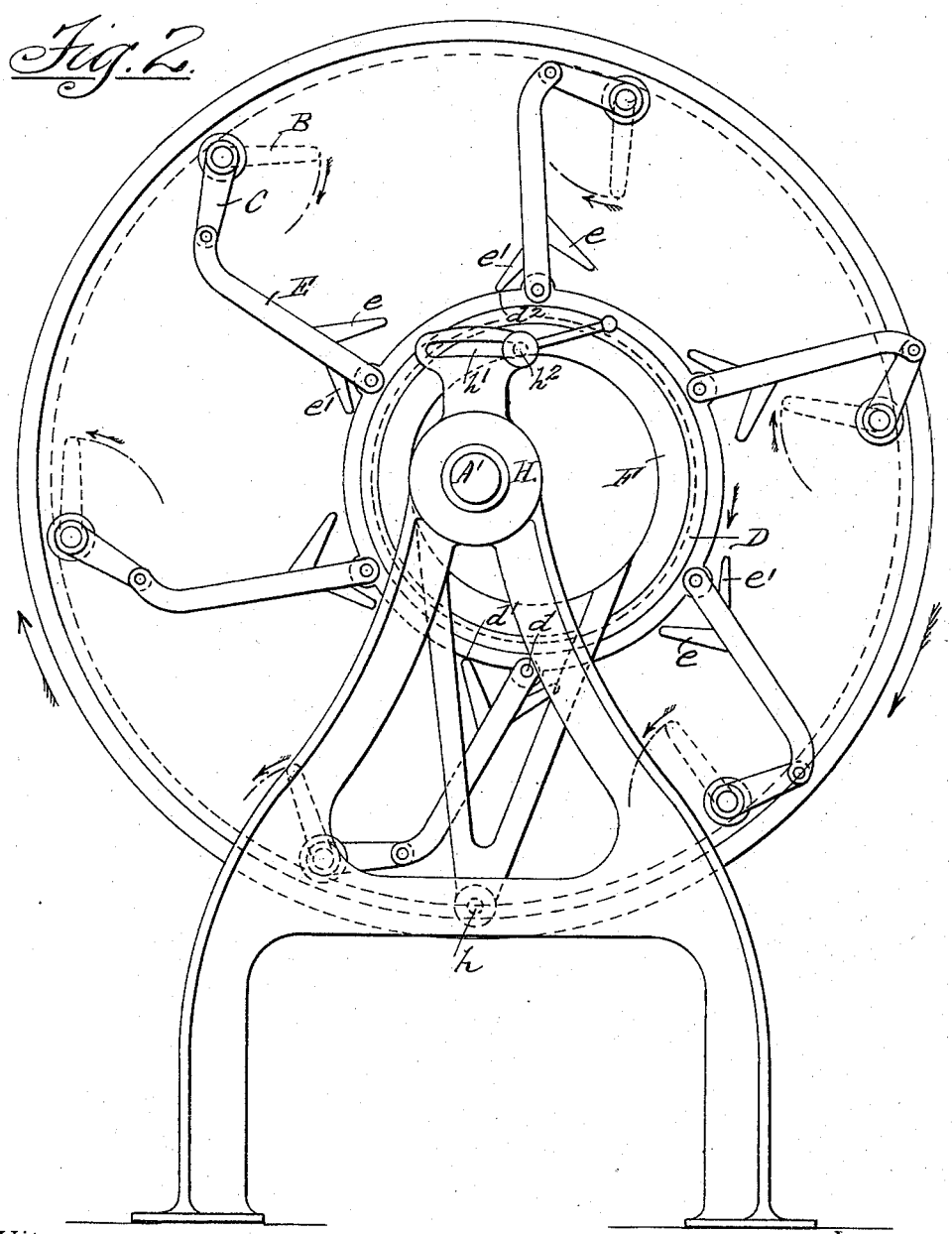

UNITED STATES PATENT OFFICE.

DAVID TOWNSEND SHARPLES, OF WEST CHESTER, PENNSYLVANIA.

COMBINED CHURN AND BUTTER-WORKER.

SPECIFICATION forming part of Letters Patent No. 638,363, dated December 5, 1899.

Application filed December 27, 1898. Serial No. 700,345. (No model.)

*To all whom it may concern:*

Be it known that I, DAVID TOWNSEND SHARPLES, a citizen of the United States of America, and a resident of West Chester, county of Chester, State of Pennsylvania, have invented certain new and useful Improvements in a Combined Churn and Butter-Worker, of which the following is a specification.

My invention relates more especially to that class of machines adapted particularly for dairy use, in which either a churning or a kneading action may be produced, such as are required for churning and butter-working, respectively; but it is also applicable to other apparatus requiring similar mechanical movement. In this class a rotary drum or vessel is commonly employed. In my improved machine illustrated in preferred form in the accompanying drawings I provide presser blades or vanes pivotally mounted, so as to be capable of a rocking movement, and I adapt said vanes to operate not only as churning paddles or splashers, but in addition to serve, when desired, as butter-working devices. In order to effect this latter function, I provide, in connection with the usual drum-rotating mechanism, an operating mechanism for said pivotally-mounted vanes so arranged when thrown into action as to impart a rocking or reciprocating motion to the latter, whereby they are adapted, when turned into lowered position by the rotation of the drum, to take hold of and raise the massed butter in front of them and thereafter to press the latter by the rocking motion imparted to them simultaneously with their being carried upward by the continued rotation of the drum, and, finally, to release and drop the pressed mass for a repetition of the operation by a succeeding blade.

Figure 1 is a vertical longitudinal section of the machine. Fig. 2 is an enlarged end view indicating the arrangement and action of the presser-vanes and connected mechanism during the butter-working operation. Fig. 3 is a similar end view, on a smaller scale, indicating the churning arrangement. Figs. 4 and 5 show modifications of the vane arrangement and of the rocking mechanism therefor, respectively.

A represents a drum or rotary vessel of any ordinary form, having closed ends $a\ a$ and a suitable door. (Not shown.) This drum is mounted on a central shaft or trunnions $A'$ in fixed bearings H and is provided with suitable means for rotating it. Within the drum is a series of vanes B, extending lengthwise thereof, each of which is mounted at its opposite ends on gudgeons $B'\ B^2$, one of which, $B'$, as indicated in Fig. 1, extends through the drum end $a$, which serves as a bearing, and is provided on its outer end with crank-arm C, through which a rocking working motion may be given to the vane, as will be hereinafter described. These vanes have a double function. In the first place they are adapted to serve as ordinary paddles or dashers in the churning operation, for which service they are preferably held in substantially fixed position relative to the wall of the drum, so as to obstruct and agitate the cream as usual during the rotation of the drum. In the second place they are adapted to serve as pressing devices, as in the operation of "working" butter, for which purpose there is imparted to them a rocking motion of their own acting simultaneously with the rotation of the drum, the latter motion serving to present the butter or other material, as the case may be, to the pressing or squeezing action of the blades, which action results from the rocking motion of the latter relative to the drum itself. I will now describe a preferred operating mechanism for these vanes.

Adjustably secured to one of the standards $H'$ in which the drum is mounted is what I term an "eccentric" F. This part may, however, as shown, be set either eccentric with the axis of the drum or concentric, being in the construction shown pivoted to the standard $H'$ at a point $h$ and arranged to swing transversely, a slot $h'$ and clamping-screw $h^2$ permitting it to be locked in either concentric or eccentric position, as desired. This eccentric carries a strap or ring $d$, which is loosely mounted upon its periphery. To ears $d$ on this ring are pivoted a series of links E, the outer ends of which are connected to the crank-arms C on the projecting gudgeons $B'$ of the vanes B.

In order to control the movement of the ring or strap D and insure the proper action of the vanes B, each of which must, during the butter-working operation, be made to assume in succession the different positions relative to the wall of the drum and the center of rotation which are required to effect the seizing, pressing, and releasing action, I provide stops e and e', so arranged as to permit of only such a limited movement of each link upon its pivotal connection to the ring or strap as will secure the required swing of the connected vane B during the rotation of the drum, yet will compel the ring or strap to rotate upon the eccentric F as the drum rotates. These stops during the churning operation when the eccentric is concentrically arranged, as indicated in Fig. 3, each occupy substantially the same position or angle relative to the ring D, contacting with the latter in front of each pivotal connection $d$ or to the rear of the same, according as the strains are greatest in one direction or the other, but in no case allowing the vanes to be swung far from the approximately radial position which it is preferable to maintain during the churning operation. When, however, the eccentric is set eccentrically for the butter-working operation, as shown in Fig. 2, the position of each stop relative to the ring or strap varies at different points in the circle of rotation, each link successively contacting with the ring at one portion of the circle, as at $d'$, Fig. 2, or at a point on the opposite side of the pivotal connection $d$, as $d^2$, if the strains be reversed, as is apt to occur in the practical operation of the machine.

It will be understood from the above description that when the eccentric is set concentric with the shaft, as indicated in Fig. 3, the machine will operate as an ordinary churn, the vanes B operating as fixed paddles or dashers. After the churning operation is completed the buttermilk may be drawn off and the eccentric shifted to the position indicated in Fig. 2 for the butter-working operation, during which latter the vanes B each assume in succession each of the various positions indicated in said figure during the continuous rotation of the drum, thus working the butter by pressing it against the wall of the drum as it is carried upward and then releasing and dropping it to the bottom of the drum to be again seized and pressed, the rotation of the drum being merely continued until it has been sufficiently worked.

By means of my improved pressers, or "presser-vanes," as I have designated them, I not only provide a combination churn and butter-worker of generally advantageous construction and operation, but I also secure an improved effect in the pressing action upon the butter as distinguished from the grinding action involved in the use of grooved rolls, as heretofore provided for in machines of this class.

While I preferably employ the particular eccentric mechanism described for effecting the proper rocking motion of the vanes B simultaneously with the rotation of the drum and have specially adapted the same to satisfactorily accomplish the particular work required, I do not desire to limit my invention to the use of this specific mechanism, as the required motions may be effected by different means. For instance, a fixed cam M may be employed, as indicated in Fig. 5, the crank-arms C of the blades being provided with rollers which ride in the irregular track of the cam, which track is so shaped as to impart a rocking motion to the vanes. Neither is it essential that the butter shall be pressed between the vanes and the wall of the drum, as in the preferred construction shown. In Fig. 4, for instance, I have indicated a modified arrangement of the rocking vanes in which the latter are arranged to operate in pairs, the butter being pressed between them instead of against the wall of the drum. I desire to include these and other modifications which are within the spirit of my invention.

What I claim is—

1. The combination with the rotary drum or vessel, of pressers mounted therein so as to have a partial rotary movement on their own axes and operating mechanism engaging therewith and adapted to impart to the same a rocking movement of their own while they are being rotated bodily with the drum.

2. The combination with the rotary drum or vessel, of pressers mounted therein so as to have a partial rotary movement on their own axes and operating mechanism for said pressers whereby the latter are automatically swung into position to successively seize, press and release the butter or other material contained in the rotating drum.

3. The combination with the rotary drum or vessel, of pressers mounted therein so as to have a partial rotary movement on their own axes and operating mechanism engaging therewith and adapted to impart to the same a rocking movement of their own while they are being rotated bodily with the drum, said mechanism being arranged to automatically rock said blades successively into approximately radial position when fully lowered, and thereafter to swing the same, first toward the wall of the drum in the direction of rotation and then away from said wall, whereby the contained butter is successively seized, pressed and released by the pressers during the rotation of the drum.

4. The combination with the rotary drum or vessel, of pressers mounted therein, operating mechanism engaging the said pressers and adapted to impart to the same a rocking movement of their own while they are being rotated with the drum and means for holding said pressers in substantially fixed position relative to the wall of the rotating drum.

5. The combination with the rotary drum or vessel, of a series of pressers mounted therein and having gudgeons or shafts projecting through the head of the drum, operating mechanism engaging said projecting gudgeons or shafts and adapted to impart to each presser a rocking motion of its own while it is being rotated bodily with the drum, and means for locking said operating mechanism to hold the pressers in approximately fixed position within the rotary drum substantially as set forth.

6. The combination with the rotary drum or vessel, of a series of pressers mounted therein, cranks fixed to the axes thereof, an adjustably-fixed eccentric, a ring or strap rotatably mounted on said eccentric, links connecting said ring or strap to said cranks and stops to limit the movement of said links on their pivotal connection to said ring or strap substantially as set forth.

7. The combination with the rotary drum or vessel, of a series of pressers mounted therein, cranks fixed to the axes thereof, an adjustably-fixed eccentric, a ring or strap rotatably mounted on said eccentric, links connecting said ring or strap to said cranks, and a series of stops adapted to stop the pivotal movement of each of said links in succession and thereby regulate the movement of the ring or strap with the drum substantially as set forth.

8. The combination with the rotary drum or vessel, of a series of pressers mounted therein, cranks fixed to the axes thereof, an eccentric, a ring or strap thereon, links connecting said ring or strap to said cranks, and a series of stops at front and rear of said links to regulate the movement of the ring or strap with the drum substantially as set forth.

9. The combination with a rotary drum or frame, of a series of rockers mounted therein, an adjustably-fixed eccentric, a ring or strap rotatably mounted on said eccentric, links connecting said ring or strap to said rockers and stops to limit the movement of said links on their pivotal connection to the ring or strap substantially as set forth.

Signed by me at West Chester, Pennsylvania, this 10th day of December, 1898.

DAVID TOWNSEND SHARPLES.

Witnesses:
MARK PENNEL MCFADDEN,
MARTHA SHARPLES.